United States Patent
Lang

[11] 3,878,763
[45] Apr. 22, 1975

[54] HYDRAULIC STEERING CONTROL SYSTEM

[75] Inventor: Armin Lang, Schwabisch Gmund-Bettringen, Germany

[73] Assignee: Zahnradfabrik Friedrichsafen AG, Friedrichshafen, Germany

[22] Filed: Oct. 4, 1973

[21] Appl. No.: 403,536

[30] Foreign Application Priority Data
Oct. 6, 1972  Germany............................ 2249181

[52] U.S. Cl.................... 91/391 R; 91/462; 60/468; 60/494; 180/79.2 R
[51] Int. Cl.......................... B62d 5/10; F15b 13/10
[58] Field of Search .................. 180/79.2 R, 79.2 B; 91/400, 440, 462, 391 R; 60/468, 494

[56] References Cited
UNITED STATES PATENTS

| | | | |
|---|---|---|---|
| 3,092,083 | 6/1963 | Sheppard | 180/79.2 R |
| 3,252,380 | 5/1966 | Jablonsky et al. | 91/400 |
| 3,385,389 | 5/1968 | Symons et al. | 180/79.2 B |
| 3,566,749 | 3/1971 | Allen | 180/79.2 B X |

Primary Examiner—David Schonberg
Assistant Examiner—J. A. Pekar

[57] ABSTRACT

A power boost steering system is provided using hydraulic pressure controlled through a metering pump wherein toward the limit of travel of the vehicle wheels pressure boost is dropped and the steering mechanism then actuated only under manual power by virtue of rotation of the steering wheel. Accordingly, only manual force can be brought to bear on the steering mechanism at the ends of travel in either direction of steering so as to avoid damage which might be occasioned were hydraulic power boost used up to the point where the steering mechanism had reached its limits of mechanical motion. A particular advantage resides in the dropping of boost pressure at the servopump instead of at the servomotor in order to preserve synchronized movement between the manually operated steering wheel and the steered wheels of the vehicle.

11 Claims, 7 Drawing Figures

HYDRAULIC STEERING CONTROL SYSTEM

In general, hydraulic power boost systems utilize a servopump and a servomotor wherein pressure fluid feed and exhaust therebetween is controlled by rotation of the steering wheel. In certain systems, of which the present invention is an improvement, a metering pump is utilized which is intermediate the output of the servopump and the sevomotor, in conjunction with certain valving, so that pressure fluid to the pump is controlled by rotation of the steering wheel actuating the metering pump. Such metering pumps are generally positive displacement gear pumps and systems as above mentioned are conventional and well known.

In the present invention means are provided whereby outlet pressure of the pump is bypassed to the pump inlet toward the end of the stroke of the servomotor piston in either direction. The arrangement is such that continued movement of the servomotor piston is effected by continued movement of the vehicle steering wheel but only that pressure occasioned by rotation of the metering pump is effective on the servomotor piston. Accordingly, no mechanical damage to the steering system can occur and a distinct advantages resides in the fact that economies are achieved since close assembly and finishing tolerances are not necessary.

The system of the present invention has advantages over prior art systems using hydraulic power boost since there is no loss in synchronization between the steering wheel and the steered wheels of the vehicle. In prior art systems there is such loss of synchronization since they rely merely upon pressure relief of pressure chambers of servomotors. Accordingly, mechanical linkage is also added in prior art systems in order to preserve synchronization. In the system of the invention the cut-off of booster pressure to the servomotor is not effected at the servomotor but is effected at the servopump by virtue of bypass thereof from outlet to inlet responsive to position of the servomotor piston or to other mechanical elements depending upon the type of vehicle in which the invention is used.

In a basic version of the present invention, the servomotor cylinder is provided at each end with a ball check bypass valve having a stem extending a predetermined length into the pressure chamber at the respective end of the cylinder. Upon the piston's arriving near a cylinder end, it engages a valve stem to open a bypass valve and this serves to drop the pressure at one side of a differential pressure operated valve which is connected across the servopump. The effect, accordingly, is to bypass the pump from outlet to inlet via suitable conduit means, and throttle valve components and thus there is no high pressure from the servopump exerted on the servomotor piston. However, although the servopump pressure feed is through a metering pump rotated by the steering wheel and such pressure feed no longer exists at the time, nevertheless continued rotation of the metering pump by the steering wheel feeds pressure to the servomotor, but the pressure force on the piston is exerted only by manual power and therefore avoids damage to the steering mechanism and linkages of the vehicle.

A number of modifications not only of the invention but also of the type of vehicle with which the invention can be used are disclosed herein, including variations in valving, bypass and check valve constructions. For example, in one arrangement a relief valve is provided to guard against sudden mechanical shock in the steering wheel due to the sudden drop in booster pressure in the servomotor. In another arrangement a relief valve is utilized to guard against road shock. Such arrangements have a distinct advantage in systems of the present invention wherein a multiway slide valve is utilized intermediate the metering pump and the servomotor. Thus, such multiway valve is in neutral position and blocks connections to the servomotor in straight-ahead steering. It can therefore be seen that the oil in the chambers on both sides of the servomotor piston acts as a solid body and road shock would be directly transmitted to the servomotor and all parts of the system and vehicle connected thereto. Similarly, an arrangement for provides pressure relief when there is a sudden drop in servomotor pressure, advantageous since the sudden loss of booster power could otherwise cause the steering wheel to kick back, that is reverse, in the operator's hands.

A detailed description of the invention now follows in conjunction with the appended drawing, in which.

Figure 1:
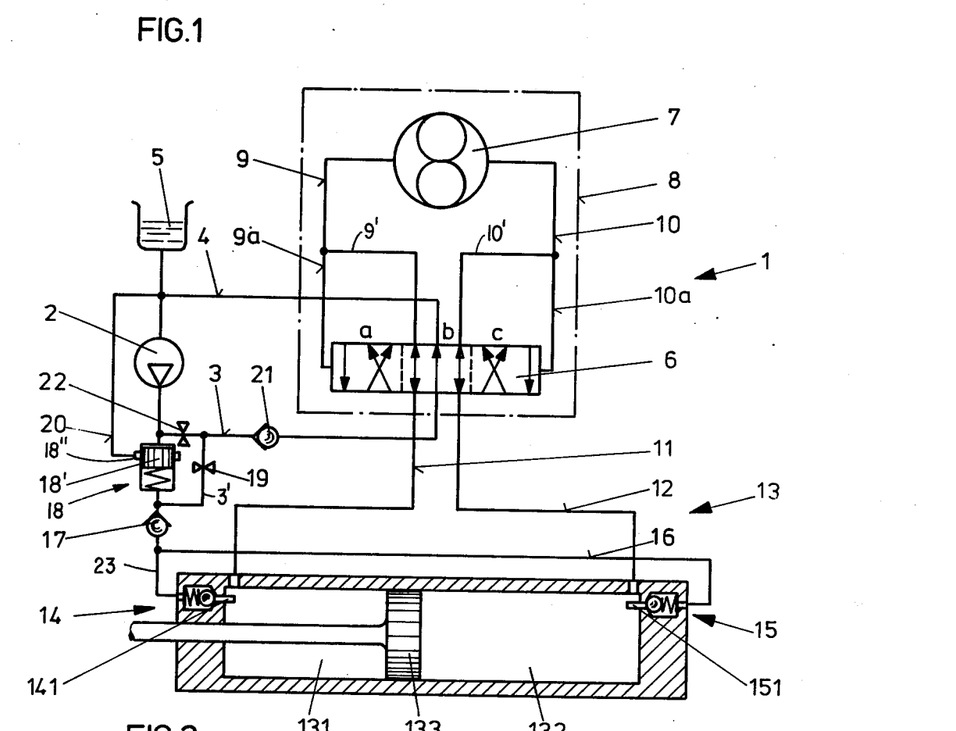
FIG. 1 is a diagrammatic illustration of a system utilizing the invention showing a servomotor cylinder in cross section, including a pressure differential piston valve in diagrammatic form, all for the purpose of disclosing the hydraulic and mechanical functioning of the system.

Referring to FIG. 1, the manual control pumping system 1 comprises a positive displacement metering pump 7 operated by manual effort of a vehicle driver rotating a steering wheel. The pump is reversible and connects via conduit 9 and 9a to one end of a pressure operated multiway valve 6 and via conduits 10 and 10a to the other end. This is all part of a steering assembly 8 as symbolized by the phantom line rectangle enclosing various components. What has been described is completely conventional in that rotation of the metering pump in one direction or the other will effect shift of the multiway control valve 6 to achieve its valving functions for positions "a," "b," and "c." Conduits 9' and 10' connect respective sides of the pump 7 with valve 6. Conduits 11 and 12 connect valve 6 with respective pressure chambers 131 and 132 of hydraulic servomotor 13, piston 133 separating the chambers. It will be understood that the piston connects to a steering mechanism linkage in the usual manner.

A tank or reservoir 5 feeds an engine driven servopump 2 having its outlet side connected via a pressure feed line 3 to a throttle valve 22 and relief ballcheck valve 21 to control valve 6. The outlet side of the pump also connects to a differential pressure piston valve 18 having valve piston 18' and an annular channel 18" connecting via a bypass conduit 20 to tank 5 or the inlet side of the servopump, which inlet side and tank also connected via a conduit 4 to slide valve 6.

It will be appreciated that movement of control valve 6 to position a or c will feed or exhaust respective chambers 131 and 132 in the usual manner by way of passages in the valve and by utilization of the conduits described.

In the modification of FIG. 1 the invention comprises providing ball check bypass valves 14 and 15 in respective end walls of the servomotor cylinder by machining sockets and seats to effect valve chambers for valves 14 and 15. These valves have respective stems 141 and 151 extending a predetermined distance into respective servomotor chambers 131 and 132. The openings of the valve chambers are connected via a bypass system pressure bias conduit 16 effecting communication between the valve chambers and to the outlet side of a check valve 17 having an inlet side connected to a differential pressure operated piston valve 18 at the lower or spring side of piston 18' Conduit 3 also connects via conduit 3' and a throttle valve 19 to the lower side of piston 18' and thus to the inlet side of check valve 17. Valve piston 18' is biased upwardly by the spring shown to close on an annular channel 18" in the valve housing which channel connects to a bypass conduit 20 communicating with the inlet side of servopump 2.

It will be noted that servopump outlet pressure exists on both faces of valve piston 18' to maintain it in equilibrium, closing channel 18" at this time.

From the preceding description it will be apparent that servopump outlet pressure suitably controlled as by throttles 22 and 19 can pass check valve 16 in order to effect a common bias closing pressure at the rear sides of the bypass valves 14 and 15 via conduit 16 which valves are otherwise spring-pressed to seated position, as shown, but biased against pressure in respective chambers 131 and 132 by the outlet pressure of the servopump 2.

OPERATION

As seen in FIG. 1, piston 133 is in neutral straight ahead steering position. Valve 6 is in position b and the entire system is pressure balanced. Pressure from servopump 2 is bypassed via check valve 21 through balanced valve 6 to the pump inlet, no flow taking place via pressure operable spring biased piston valve 18 in the position shown. If now the metering pump 7 is actuated by rotation of the vehicle steering wheel in a direction to increase pressure in, say, conduit 10, there is a reduction of pressure in conduit 9. This difference in pressures transmitted via respective conduits 9a and 10a moves the multiway valve 6 to position c, thus pressurizing cylinder chamber 132 via conduit 3, valve 6, conduits 9' and 9, pump 7, conduits 10, 10' and 12. Piston 133 is moved to the left to effect exhaust of chamber 131 via line 11, valve 6, conduit 4, to the tank 5 or to the suction side of the servopump.

Steering is then effected by means of the hydraulic pressure on piston 133 acting through the piston rod on a steering mechanism linkage in a well known manner. It will be noted, however, that should the servopump 2 not be operating, manual steering by hydraulic transmission is possible upon actuation of metering pump 7 due to the mode of connection of lines 9, 10, 9a, 10a, 11 and 12 existing between the metering pump 7 and the power cylinder, valve 6 being again shifted to position c assuming the same direction of rotation of the steering wheel.

With control valve 6 in position c and the servopump 2 operating, outlet pressure must pass through valve 6 and pump 7 to reach chamber 132, and moves piston 133 to ultimately engage valve stem 141 to open bypass valve 14. Cut-off of pressure to chamber 132 then occurs by bypass operation of piston valve 18.

Thus, the piston valve 18 being disposed between conduit 3 and the pressure bias conduit 16 is normally acted on by outlet pressure of servopump 2 on both sides of its piston 18'. This occurs via throttle valve 19 controlling pressure flow from conduit 3, which pressure flow via throttle valve 19 is connected to valve 14 via check valve 17 which blocks back flow from conduit 16. However, outlet pressure of the servopump 2 to the lower side of the valve piston 18' is dropped through (now open) valve 14 to exhaust via conduit 11. The valve piston 18' then being unbalanced moves downwardly, overcoming the spring bias, to open the channel 18" and effecting flow from servopump outlet conduit 3 to bypass conduit 20, to the tank 5 and the servopump inlet. The effect is to drop all fluid pressure power from servopump 2 so that steering power via piston 133 can now occur only by pressure due to manual force acting through the steering wheel to rotatably actuate metering pump 7.

In this pressure cut-off operation, the relief valve 21 prevents strong reaction or kickback to the steering wheel due to sudden cessation of booster pressure from servopump 2, while throttle valve 22 effects precise control for a desired booster flow rate.

Synchronized movement between a steering mechanism and steering wheel is maintained during cut-off booster power since no fluid can escape from chamber 132, the biasing arrangement for valve 15 being such that pressure effected only by manual operation of pump 7 is not sufficient to open valve 15. Thus, no return flow from valve 15 via bypass system conduit 16 to valve 14 (now open) can be lost to exhaust via conduit 11 from chamber 131.

It will be apparent from the symmetry of the conduit and component arrangement of FIG. 1 that steering in the opposite direction is effected by reverse rotation of metering pump 7 and the cut-off operation for chamber 131 is then effected when piston 133 engages stem 151 to open bypass valve 15, the control valve 6 then being in position a, pressure exhaust from chamber 132 than taking place. Thus, piston 133 moves to the right as seen on FIG. 1, if need be to the limiting position to actuate stem 151 at which time only manual power is effective, all as described above for a further and final movement of piston 133 to the right.

To resume normal booster pressure operation after cut-off of pressure to, say, chamber 132, steering direction is reversed via the steering wheel to reverse pump 7 which effects shift of valve 6 from position c to position a, pressurizing chanber 131. Such operation then blocks fluid escape from the underside of piston 18' and it is biased by its spring back to the position shown FIG. 1. This cuts off flow via bypass conduit 20, pressure equilibrium on the valve piston being again established via throttle valve 19.

Rotation of the steering wheel to center position for straight ahead steering from either left or right steering effects closure of either valve 14 or 15, depending on which had been opened to bypass the pressure boost, and restores the neutral balanced condition of piston 133 as depicted. Obviously, in any steering operation it is not necessary to move piston 133 to the limit of travel if only a slight extent of turning of the vehicle is required, since the steering linkage mechanism would not then reach its travel limit beyond which pressure boost could cause damage. In this connotation, the length of stems 141 and 151 are such that a suitable extent of manual steering is provided for safe travel of the steering linkage at the approach to its mechanical limit in either direction.

Thus, close tolerances of the mechanical components of the hydraulic system and of the steering mechanism are not necessary.

Figure 2:
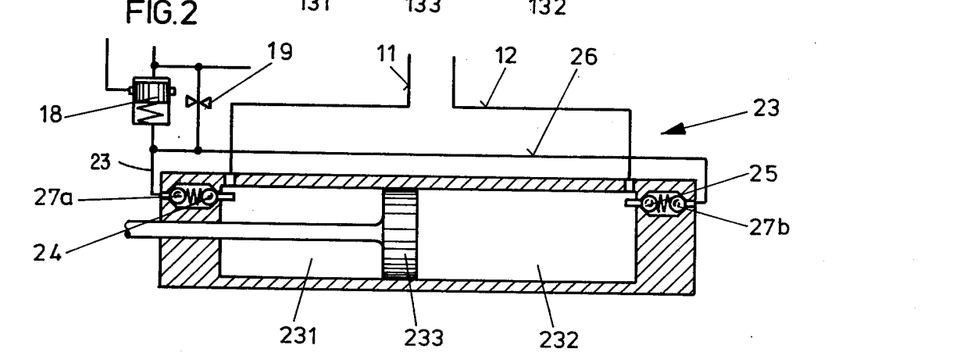
FIG. 2 shows a modification of certain of the valving of FIG. 1.

The modification of FIG. 2, showing servomotor 23 differs from that in FIG. 1 by omitting check valve 17 and substituting check valves 27a and 27b in the same cylinder end sockets that house, respectively, the bypass valves 24 and 25 which perform in the same manner as valves 14 and 15, respectively, of FIG. 1.

Like reference numerals are carried over from FIG. 1 for the same components, FIG. 2, however, showing cylinder chambers 231 and 232 with piston 233 therebetween and bypass system conduit 26.

The check valves 27a and 27b permit flow only in respective opening directions and therefore the pressure needed to open respective bypass valves 24 and 25 can be less than that effected manually by the metering pump 7 (not shown in FIG. 2).

The purpose of check valves 27a and 27b prevent escape of pressure fluid from respective cylinder chambers 231 and 232 through throttle valve 19 which might occur due to road shock. These check valves also have the further advantage of providing a safety factor in event of breakage of bias conduit 26, preventing loss of pressure fluid thereby from the cylinder chambers being fed from metering pump 7.

Throttle valve 19 determines the cross section flow area of bypass valves 24 and 25 and bias line 26 connecting to piston valve 18. It can be made small and thus providing for closer fitting bypass valves which could be seat valves.

It should be noted that specific components of FIGS. 1 and 2 could be combined if it were so desired. For example, it might be desired to retain the function of throttle valve 22 to limit flow to a suitable value for coaction with the particular dimensions and spring force of piston valve 18. Thus, valve 22 could be used in the modification of FIG. 2, and obviously, various selection of components of FIGS. 1 and 2 are possible.

Figure 3:
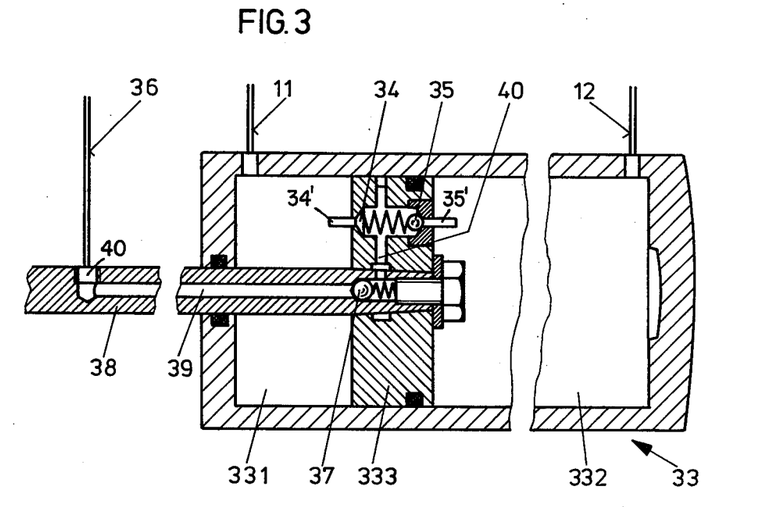
FIG. 3 shows a further modification of the valving in which the bypass valves are carried by the servomotor piston.

In the modification of FIG. 3, two spring biased bypass valves, 34 and 35, are provided in booster piston 333 in the cylinder of servomotor 33 having pressure chambers 331 and 332 fed by conduits 11 and 12, respectively, as in FIGS. 1 and 2. Booster piston rod 38 has an axial bore 39 coupled at radial bore 40 to a flexible pressure bypass system tube 36 exterior of the cylinder which will be understood to connect to a differential pressure valve such as valve 18 of FIGS. 1 and 2 in the manner taught for conduit 16 or 26.

The inner end of bore 39 is closed by a relief check valve 37. Valve stems 34' and 35' engage respective cylinder ends for pressure bypass operation of valves 34 and 35, respectively.

Valves 34 and 35 serve the functions of valves 14 and 15 of FIG. 1 (or 24 and 25 of FIG. 2) while valve 37 serves the function of valve 17 of FIG. 1 and the operation is as heretofore described.

Figure 4:
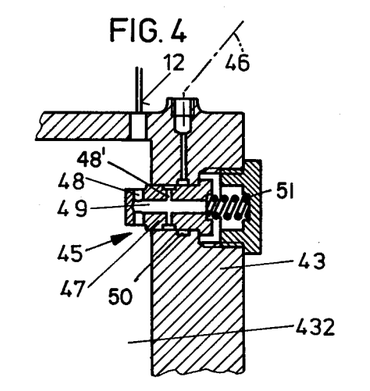
FIG. 4 shows a modified bypass valve of a pressure balanced type.
Figure 5:
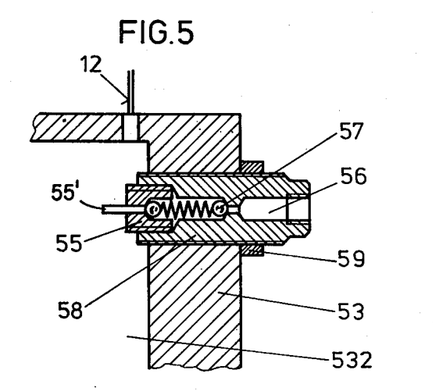
FIG. 5 illustrates a further valve modification in which adjustability of the point at which the servomotor piston commences to open a bypass valve can be predetermined selectively.

FIGS. 4 and 5 shows special designs of the bypass valves, and as indicated by conduits 12 as disclosed in FIG. 1, the valves in each instance are shown for the right side pressure chamber of the servomotor, it being understood there would be a duplicate valve at the opposite side of the cylinder.

In FIG. 4 a pressure balanced bypass valve 45 is disposed in the end wall of a servomotor 43 with no need for pressure biasing. Pressure conduit 12 coming from the metering pump connects to servomotor pressure chamber 432, and a bypass system conduit 46 is normally blocked at channel 50 in the end wall and connects to valve 45 at each end of the cylinder. Each valve 45 comprises a spring biased piston 47 with radial bores 48 and 48' leading from axial bore 49. When the servopiston (not shown) engages the inwardly extended end of spring located valve 45, communication is established between the conduit 46 and the pressure chamber 432 via the radial and axial bores, as a result of which there is pressure drop below piston 18' of a valve such as 18 (FIG. 1) in the manner heretofore described to drop booster pressure in the servomotor by bypass flow via a conduit 20.

In FIG. 5 a bypass valve 55 with a bypass system conduit 56 is disposed in an axially adjustable housing 58 in the end wall of a servomotor 53 having pressure chamber 532. A relief check valve 57 is also provided in the housing which is provided threadedly secured in the end wall. A common spring biases the valve balls to closed position as shown. The casing is locked by a jam nut 59 against the end wall. The arrangement and operation of valves 57 and 57 is similar to valves 25 and 27b of FIG. 2, and, of course, the opposite end wall of servomotor 53 would have a valve arrangement like valves 24 and 27a of FIG. 2.

Opening of valve 55 by the servomotor piston engaging stem 55' releases pressure from cylinder chamber 532 via the conduit 56 upon opening of valve 57, which conduit 56 will be understood to connect to a valve such as 18 of FIG. 1, including the components to bypass the servopump outlet to inlet so that only manual force by means of the metering pump is then operable.

Figures 6, 7:
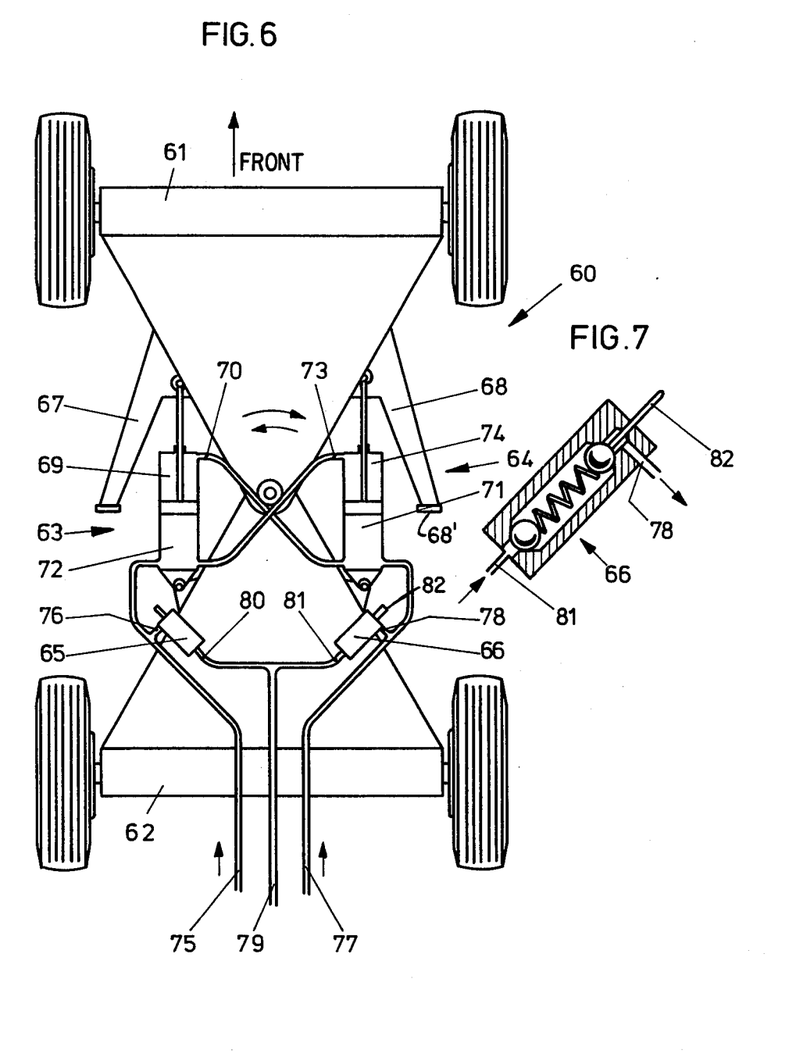
FIG. 6 illustrates the application of the invention to an articulated body vehicle.
FIG. 7 illustrates details of the valving of FIG. 6

Referring to FIG. 6, an articulated body vehicle 60 is disclosed having body sections 61 and 62 pivotally joined at approximately the center of the vehicle, each body section having a pair of non-steerable wheels, as shown. Thus, the vehicle is steered by effecting relative rotation of the body sections with respect to each other in one direction or the other as indicated by the arcuate arrows. Section 61 may be considered the front of the vehicle.

In this arrangement a pair of servomotors 63 and 64 is utilized. One such servomotor 63 having pressure chambers 69 and 72 is connected between the body sections at the left of the vehicle while the other servomotor 64 having pressure chambers 71 and 74 is connected between the body sections at the right side of the vehicle.

It will be obvious that if pressure chambers 69 and 71 are pressurized, the section 61 of the vehicle will rotate counterclockwise while the section 62 will rotate clockwise. It will likewise be obvious that pressuring of chambers 72 and 74 will cause relative rotation of the body sections in the opposite directions.

Each side of the vehicle is provided with a combination bypass and pressure relief valve substantially the same as that shown at the cylinder ends in FIG. 2. In this instance, such a device as valve 65 is provided for servomotor 63 while the valve 66 (shown in detail in FIG. 7) is provided for the servomotor 64. Referring now to FIG. 7, it will be noted that the combination bypass and relief valve comprises a pair of ball valves having a common spring bias, all as heretofore disclosed in conjunction with FIG. 2, including a bypass valve operating stem such as 82 which when pressed inwardly can open the bypass valve ball. These valves are identical and securely fastened to the chassis of the one body section 62 being disposed so that arms such as 67 and 68 rigidly carried by the other body section can engage respective valve stems to open respective bypass valves when the two body sections of the vehicle have swung in respective directions for left or right steering to a desired extreme of relative rotation with respect to each other. Thus, as seen in FIG. 6, the abutment 68' at the end of arm 68 can engage valve stem 82 to effect bypass operation when the vehicle is steering to the right and, of course, the same effect is had between arm 67 and valve 65 when the vehicle is steering to the left.

It will be noted that the servomotor chambers are cross connected such that conduit 70 connects chambers 69 and 71 while conduit 73 connects chambers 72 and 74. Similarly, a common conduit 79 connects to the axial ends via respective conduits 80 and 81 of the respective valves 65 and 66. Finally, a pair of conduits 75 and 77 which are understood to come from a multiway valve such as valve 6 of FIG. 1 connect at side passages 76 and 78 respectively of valves 63 and 64 respectively.

The conduit 79 will be understood to connect to a differential pressure operated valve such as the valve 18 as shown in FIGS. 1 and 2. It will be further understood that the bypass components are provided as taught in those figures in conjunction with a servopump, such as conduit 3, throttle valve 19, bypass conduit 20, and any other components desired as taught in those figures.

In essence, the operation of the system of FIG. 6 is substantially the same as that heretofore described for a single cylinder servomotor system in conjunction with FIG. 2. This will be apparent since all conduit connections are in parallel and it is merely a matter of effecting the functioning of two servomotors in opposite directions to steer an articulated body section vehicle.

If, for example it be assumed that the upper body section 61 as seen in FIG. 6 is the front of the vehicle and is steered to the right, pressure chambers 72 and 74 being pressurized via line 75, the chambers 69 and 71 exhaust via line 77, it being understood that this is all under the control of a multiway valve connecting to a tank and servopump inlet. At this time a valve such as valve 18 is balanced for reasons hereinabove pointed out since servomotor outlet pressure is acting on the spring side of the valve piston, reference being had to FIGS. 1 and 2. However, toward the extreme limit of relative rotation of the body sections, stem 82 will be pressed inwardly by abutment 68' and as a result the high pressure in conduit 81, which corresponds to the conduit 23 is FIGS. 1 and 2, is released into the servomotor chambers being exhausted via connection 78, these chambers being 69 and 71, flow taking place from chamber 69 to chamber 71 via the cross connection conduit 70.

As a result, the differential pressure valve 18 moves downwardly because of lack of pressure on the underside of its piston and, accordingly, the servopump is bypassed via conduit 20, all in precisely the same manner as heretofore explained. Exactly the same operation is effected for pressure bypass in steering to the left and need not be described. Further, for straight-ahead steering the same conditions exist as would obtain for single servomotor, namely, the servomotor chambers are blocked when the multiway valve 6 is in neutral position.

In retrospect, and by way of comparison of the several modifications herein, it will be noted that the bypass system conduits 16, 26, 36, 46, 56, 79–81 may serves to initially cause a quick pressure drop in either pressure chamber of their respective servomotors upon the opening of a bypass valve. This function is in addition to providing a back bias to maintain such bypass valves closed against pressure in the pressure chambers. For example, considering FIG. 1 when bypass valve 14 is opened by piston 133, it is obvious that a sudden pressure drop in conduit 16 occurs. Since at that instant pressure chamber 132 has a high working booster pressure in it, such pressure will open bypass valve 15 to provide an instant drop in pressure in pressure chamber 132 and thereby instantly relieve booster pressure on the steering mechanism.

The same intant pressure relief would occur for all modifications and, of course, depends in degree to the biasing force of the springs acting on the bypass valves normally maintaining them closed. However, a distinction occurs in the modification of FIG. 4 in that there is no biasing pressure maintaining valve 45 normally closed since the bypass system conduit will be seen to be blocked at channel 50. The pressure in chamber 432 is transmitted to both ends of the valve piston thereby balancing the valve. It will be noted, however, that a heavier spring 51 is used than in the other modifications to insure the normal closed position of bypass valve 45 prior to engagement by the servomotor piston.

What is claimed is:

1. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extend of operation of said servomotor to open said bypass means thereby rendering servopump outlet pressure inoperable on said servomotor so that only manual operation of said metering pump effects operating pressure for said servomotor;

wherein said bypass means comprises a pair of normally closed by pass valves; said servomotor comprising a double acting cylinder and a respective bypass valve communicating with a respective pressure chamber of said cylinder; means mechanically engagable with said bypass valves responsive to said predetermined extent of said servomotor in a respective direction to open one of said bypass valves; said bypass means further comprising a differential pressure operated valve communicating with the outlet of said servopump and having a movable valve element and having a flow connection connected to receive outlet pressure for opposite sides of said movable valve element to maintain an equilibrium position thereof, said flow connection being connected to said bypass valves downstream thereof, including a bypass connection to the inlet of said servopump for bypass of pressure fluid from outlet to inlet; said bypass connection being closed by said movable valve element when in equilibrium position, whereby, upon opening of a bypass valve in a pressure chamber being exhausted outlet pressure is released from a side of said movable valve element to said pressure chamber to unbalance pressure on said movable valve element to open said bypass connection for release of outlet pressure of said servopump to the inlet thereof.

2. A system as set forth in claim 1 an outlet connection from said servopump to said differential pressure valve comprising a throttle.

3. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extent of operation of said servomotor to open said bypass means thereby rendering servopump outlet pressure inoperable on said servomotor so that only manual operation of said metering pump effects operating pressure for said servomotor;

said bypass means comprising a differential pressure valve connected across said inlet and outlet of said servopump and having a movable valve element initially blocking flow therebetween, means connecting outlet pressure to opposite sides of said movable valve element to maintain said valve in bypass blocking conditions; means to drop pressure on one such side responsive to said predetermined extent of operation of said servomotor to thereby open said valve for bypass from outlet to inlet of said servopump.

4. A system as set forth in claim 3, said bypass valves being carried in said piston and having means engagable with respective ends of said cylinder to be opened by engagement therewith; said piston having a rod with a tubular bore therethrough and a check valve closing said bore, said check valve communicating with said bypass valves and being normally closed against being opened by pressured in said pressure chambers, and a conduit means being connected from said servopump outlet through said check valve to said bypass valves.

5. A system as set forth in claim 3, each said bypass valve being carried in a respective end of said cylinder and comprising a slidable valve piston having an end extending into a respective pressure chamber and means effecting chamber pressure on said slidable valve pistons for balance thereof, and said extending ends effecting said opening means upon being engaged by a respective side of said piston toward the end of movement thereof in a respective direction.

6. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extent of operation of said seromotor to open said bypass means thereby rendering servopump outlet pressure inoperable on said servomotor so that only manual operation of said metering pump effects operating pressure for said servomotor;

said bypass means comprising a differential pressure valve connected across said inlet and outlet of said servopump and having a movable valve element initially blocking bypass flow therebetween, a conduit connecting balance pressure to opposite sides of said movable valve element to maintain said differential pressure valve in bypass flow blocking condition; bypass control means to drop pressure on one side of said movable valve element responsive to said predetermined extent of operation of said servomotor to thereby open said differential pressure valve for bypass flow from outlet to inlet of said servopump; said servomotor comprising a double acting hydraulic cylinder having a pair of pressure chambers separated by a piston and said bypass control means comprising a respective normally closed bypass valve connected with each pressure chamber, and opening means for each said bypass valve operable in response to said predetermined extent of operation of said servomotor to relieve pressure on said one side on said movable valve member thereby effecting movement of said movable valve element to permit bypass flow.

7. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extent of operation of said servomotor to open said bypass means thereby rendering servopump outlet pressure inoperable on said servomotor so that only manual operation of said metering pump effects operating pressure for said servomotor;

said bypass means comprising a differential pressure valve connected across said inlet and outlet of said servopump and having a movable valve element initially blocking flow therebetween means utilizing outlet pressure to maintain said movable valve element in blocking position; bypass control means to effect unblocking movement of said movable valve element comprising a bypass valve for each direction of steering, conduit means connecting said bypass valves to said differential pressure valve; bypass valve actuating means to actuate a respective bypass valve responsive to direction and extent of steering for releasing outlet pressure from said movable valve element differentially to effect unblocking movement thereof.

8. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extent of operation of said servomotor to open said bypass means thereby rendering servopump outlet pressure inoperable on said servomotor so that only manual operation of said metering pump effects operating pressure for said servomotor;

said servomotor comprising a double acting hydraulic cylinder having a pair of pressure chambers separated by a piston and said bypass means comprising a respective bypass valve communicating with a respective pressure chamber; each end of said cylinder having a valve chamber and each said bypass valve being slidably carried in a valve chamber at a respective end of said cylinder and each bypass valve comprising a portion extending into a respective pressure chamber; said extending portions being engagable by a respective side of said servomotor piston toward the end of movement thereof in a respective direction; each said bypass valve having a throughbore communicating with the respective pressure chamber whereby pressure existing therein is effective at both ends of said bypass valve to maintain pressure equilibrium thereon, and biasing means to maintain each said bypass valve in an initial position; including passage means in said bypass valves and in said respective cylinder ends normally in non-communicating relation but communicating when either of said bypass valves is actuated in a respective direction by said servomotor piston.

9. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extent of operation of said servomotor to open said bypass means thereby rendering servopump outlet pressure inoperable on said servomotor so that only manual operation of said metering pump effects operating pressure for said servomotor;

said servomotor comprising a double acting hyraulic cylinder having a pair of pressure chambers separated by a piston and said bypass means comprising a respective normally closed bypass valve at each end of said cylinder communicating with a respective pressure chamber and means engagable by respective sides of said servomotor piston to actuate said bypass valves, including a normally closed check valve in each end of said cylinder in communication with a respective bypass valve and bias means for maintaining said valves normally closed, wherein said valves open in opposite directions and said check valves are closed by flow through the respective bypass valves.

10. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extent of operation of said servomotor to open said bypass means thereby rendering servopump outlet pressure inoperable on said servomotor so that only manual operation of said metering pump effects operating pressure for said servomotor;

said servomotor comprising a double acting hydraulic cylinder having a pair of pressure chambers separated by a piston and said bypass means comprising respective normally closed bypass valves carried by said piston communicating in opposite directions with respective pressure chambers said bypass valves being operable by engagement with respective ends of said cylinder; said piston having a piston rod with a tubular bore therethrough and a normally closed check valve closing said bore, said check valve communicating with said bypass valves and being closed against flow from either bypass valve.

11. In a hydraulic steering control system of the type having elements comprising: a servopump for providing a pressure fluid, a manually operable metering pump, a multiway valve, a servomotor for operating a steering mechanism and including conduit means interconnecting said elements whereby manual operation of said metering pump effects pressurization and exhaust of said servomotor for power boost steering of a vehicle in addition to the pressurization effected by operation of said metering pump; the improvement which comprises a normally closed fluid bypass means connecting the inlet with the outlet of said servopump, and means responsive to a predetermined extent of operation of said servomotor to open said bypass means thereby rendering servopump outlet pressure inoperable on said servomotor so that only manual operation of said metering pump effects operating pressure for said servomotor;

said servomotor comprising a double acting hydraulic cylinder having a pair of pressure chambers separated by a piston and said bypass means comprising a normally closed bypass valve carried in a respective pressure chamber end wall; each said bypass valve comprising a housing secured in the respective end wall and having adjusting means to adjust the position thereof relative to the axis of said cylinder; respective actuating means carried by said bypass valves engagable by said piston toward the end of travel to open a respective bypass valve whereby the points of engagement are determined by said adjusting means; and means whereby opening of either bypass valve opens said bypass means.

* * * * *

UNITED STATES PATENT AND TRADEMARK OFFICE
CERTIFICATE OF CORRECTION

PATENT NO. : 3,878,763
DATED : April 22, 1975
INVENTOR(S) : ARMIN LANG

It is certified that error appears in the above—identified patent and that said Letters Patent are hereby corrected as shown below:

Column 3, line 33, change "16" to --17--.

Signed and Sealed this

Third Day of July 1979

[SEAL]

Attest:

Attesting Officer

LUTRELLE F. PARKER
Acting Commissioner of Patents and Trademarks